CLOSED-CIRCULAR ANNULAR TANK CIRCUIT FOR SPARK GAP TRANSMITTER

Filed March 13, 1964 3 Sheets-Sheet 1

VIEW X-X

United States Patent Office 3,317,839

Patented May 2, 1967

3,317,839

CLOSED-CIRCULAR ANNULAR TANK CIRCUIT FOR SPARK GAP TRANSMITTER

Kurt Landecker, Armidale, New South Wales, Australia, assignor to Research Corporation, New York, N.Y., a corporation of New York Filed Mar. 13, 1964, Ser. No. 351,801
Claims priority, application Australia, Mar. 20, 1963, 28,552/63
14 Claims. (Cl. 325—106)

In United States Patent No. 3,011,051 a transmitter is described which consists essentially of a circular symmetrical array of condensers separated by spark gaps. When the condensers are charged in parallel through resistors or chokes and discharged in series through the spark gaps a large amount of radio frequency power is generated by the array which acts as an oscillating magnetic dipole. The frequency of the transmitted wave is determined by the capacity of the condensers and the diameter of the circle (i.e. the inductance of the array) and the radiation resistance is determined by the diameter of the circle only.

It has now been found that the transmitter may be greatly improved and simplified while retaining all its advantages described previously by substituting in accordance with the invention for the plurality of the spark-gaps in the arrangement of United States Patent No. 3,011,051 which are associated with each condenser, one single spark gap. This is achieved by joining one of every pair of adjacent condenser terminals to a point on the axis of symmetry of the array and the other one of every pair of adjacent condenser terminals to another point on the axis of symmetry of the array by electrical conductors of equal lengths. The two junctions of the two sets of conductors on the axis of the array then form the terminals of one single sparkgap or other energy transforming device as will be described in detail hereinafter. This arrangement is illustrated by way of example for a particular case of six condensers C and corresponding pairs of conductors *a*, *b* although for maximum power output the number of condensers and associated conductors should be as large as space requirements will permit. The nature and disposition of the conductors taken singly or in pairs are of importance for the operation of the transmitter and will also be considered in detail.

The invention will now be described in detail in connection with the drawings in which:

FIGURES 1*a* and 1*b* show schematically the arrangement of condensers and conductors and of the spark gap according to the invention;

FIGURES 2*a* and 2*b* show schematically a means of tuning the transmitter illustrated in FIGURES 1*a* and 1*b* over a certain frequency range;

FIGURES 3*a* and 3*b* show a modification of the transmitter illustrated in FIGURES 1*a* and 1*b* in which transmission lines are used to connect the condensers to the single spark gap;

FIGURE 4 shows a further development of the arrangement of FIGURES 3*a* and 3*b*;

FIGURE 5 indicates a tuning arrangement for the arrangement shown in FIGURES 3*a* and 3*b*;

FIGURES 6*a* and 6*b* show the connection of the spark gap with a tuned circuit.

FIGURE 7*a* shows a cascade arrangement of a transmitter and a driving oscillator;

FIGURE 7*b* shows the detail of a coupling arrangement used in coupling the transmitter and driving oscillator shown in FIGURE 7*a*;

FIGURES 8*a* and 8*b* show geometrical transformations of the driving oscillator into a closed shell arrangement;

Figure 1A:
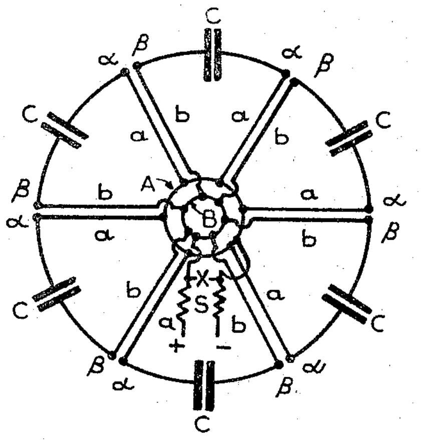
Figure 1B:
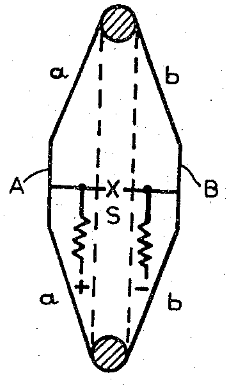

In FIGURES 1*a* and 1*b* an arrangement is shown in which a plurality of conductors *a* are joined at one of their ends to the terminals A of a single spark gap S and are connected with their other ends to the terminals $\alpha$ of a plurality of condensers C arranged in a circular array, observing the correct polarity. Likewise a plurality of conductors *b* are joined at one of their ends to the terminals B of the same spark gap S, and with their other ends to the remaining terminals $\beta$ of the condensers of the circular array. The junction points of the conductors *a* and *b* are shown in FIGURE 1*a* as small circles for clarity in drawing as well as for the purpose of explaining a particular property of the arrangement which will be referred to presently.

The operation of the transmitter according to the invention may now be described as follows. When a potential is applied to the terminals A and B and the sprak gap S breaks down the condensers in the array discharge and subsequently an oscillatory current is set up in the array as described in the United States Patent No.

The advantages of the invention over the transmitter using a plurality of spark gaps may be described as follows:

Since there is only one single spark gap used in the arrangement instead of the plurality of spark gaps the energy losses inherent in the action of spark discharges are reduced by a large factor. The emitted wave train therefore is much longer as compared to the wave train emitted by the arrangement according to United States Patent No. 3,011,051.

The initial discharging impulse initiated by the breakdown of the gap arrives of necessity simultaneously at all condenser terminals because all conductors joining the spark gap and condenser terminals are of equal lengths and therefore the time of travel of the impulse is the same for all conductors. This circumstance removes in principle any restriction on the diameter of the circular array imposed by consideration of the finite velocity of propagation of the impulse around the circumference of the array. This method of synchronization of the condenser discharges is much preferable to the synchronization by a separate impulse sent along single wires as mentioned in United States Patent No. 3,011,051.

Although here and in the following reference is made to a "spark gap" it is to be understood that this expression is used to designate any fast switch with electrical characteristics similar to an actual spark discharge gap. In reality it may consist, for example, one of or more of the following types of switches: thyratrons, gas-filled relays, solid state devices such as transistors, high vacuum thermionic or field emission tubes and the like. The fact that there is only one such switch or switching aggregate necessary for the operation of the transmitter is of over-riding importance when it is desired to operate the transmitter in the "continuous wave" mode. This means that the transmitter emits in this mode an undamped modulated or unmodulated wave or rectangular pulses of some length depending on the capacity of the available power supply. A switching aggregate which can be used advantageously with the present invention is described in detail in co-pending United States patent application, Ser. No. 351,813, now Pat. No. 3,286,196. The "spark gap" can also be replaced by a small coupling loop which allows to inject energy into the junction A–B from a separate oscillator. Suitable oscillator arrangements designed on the principles of this invention will also be described in the following.

Wherever reference is made in the text or drawings to "charging resistors" this expression is meant to include also charging chokes which when properly designed and constructed waste less electrical power than charging resistors.

The arrangement according to the invention allows of various modifications advantageous for meeting special requirements. These modifications will be described in detail.

Figure 2A:
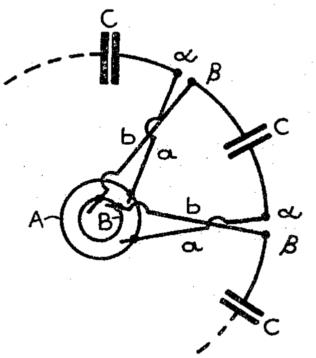
Figure 2B:
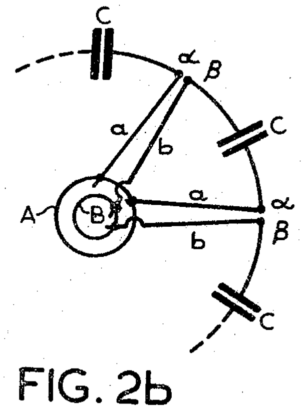

Referring to FIGURES 1*a* and 1*b*, if the leads *a* and *b* joining the condenser terminals α and β are conducted parallel to each other and in such a fashion that the shape of all sets of leads *a*, *b* exhibit circular symmetry with respect to the array of condensers then all currents induced by the oscillating array in the leads cancel out to zero. The simplest symmetrical arrangement is that in which the leads *a*, *b* connect the condenser and spark gap terminals by direct, straight paths. It may, however, be advantageous to deform all leads *a* with respect to the corresponding leads *b* to some extent, namely, in such a way that they add either positive or negative mutual inductance to the inductance of the circular array. One way of achieving this effect in a simple and controllable manner is shown in FIGURES 2*a* and 2*b* respectively. If the leads are in the position indicated in FIGURE 2*a* they couple positive mutual inductance into the main loop and so the resonance frequency of the loop is decreased. If, on the other hand, the leads are in the position shown in FIGURE 2*b* then they couple negative mutual inductance into the loop and then the resonance frequency is increased. In this particular form of the invention deformation of the leads may conveniently be brought about by twisting the ring shaped terminals A and B with respect to each other through a small angle. Tuning of the transmitter over a small frequency range is therefore effected with simple means and without any other changes in the transmitting array. In general it will not be desirable to tune over a large frequency range because the radiation resistance of the array changes with frequency. However, the method of tuning described is of very considerable advantage for the final trimming of the transmitting frequency after the completion of the design and the construction of the transmitter.

It should be noted that even when the leads *a* and *b* are straight, parallel conductors they add a certain amount of inductance to the circular array depending on its diameter. This may not be a desirable condition because for any given transmitting frequency it reduces the maximum possible energy storage capacity of the condensers in the array. Under these conditions it is possible to overcome this disadvantage by joining the terminals α and β of the tuning condensers to auxiliary by-pass condensers (not shown in the drawings). These condensers should be several times the capacity of the tuning condensers. They need not be of the same high quality as the tuning condensers themselves, however, as the energy stored in these by-pass condensers is not radiated but is dissipated in the spark gap. Moreover, the method described previously of tuning the transmitter is not applicable. For these reasons it is advantageous in almost all circumstances to modify the arrangement according to this invention in another way which will now be described.

Figure 3A:
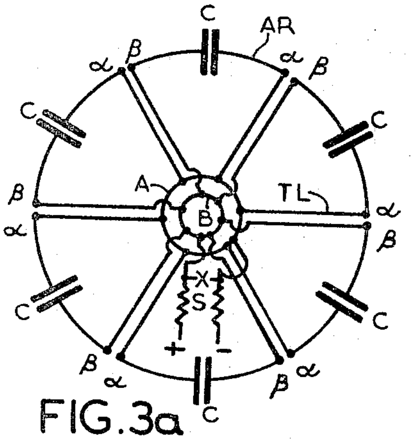
Figure 3B:
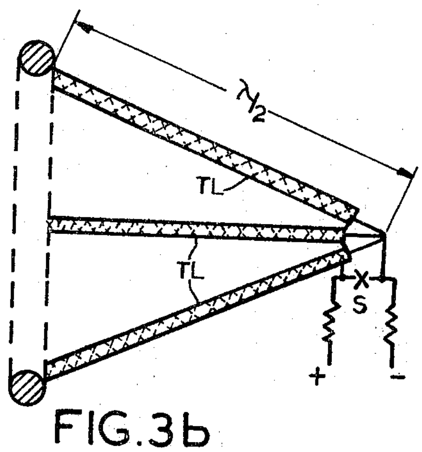

If the leads *a* and *b* are connected in parallel and if their electrical lengths are made exactly equal to one half of a wavelength or an integral multiple of half wave lengths, corresponding to the working frequency of the transmitter, then every pair *a*, *b* becomes an electrical transmission line which acts with respect to its terminal impedances like a one-to-one transformer. Therefore, the resistance of the single spark gap discharge, which is, ideally, a short circuit, is now automatically reflected across the terminal pairs α and β, that is, into the position previously occupied by the spark gaps in the arrangement of United States Patent No. 3,011,051. When the single spark discharge is initiated an oscillatory current flows in the array exactly as if the condensers C were joined by individual spark gaps. The transmission lines may be coaxial or twin low-loss cables. This arrangement, for the particular case where the transmission lines are one half wave length long, is shown in FIGURES 3*a* and 3*b*. Calculations and experiments have shown that for most purposes the transmitter can be designed such that the mean diameter of the circular array AR is within a range of 0.2 to 0.3 of one wave length. Therefore the lines are about twice as long as the diameter of the array even when the dielectrics of the lines is air. When the dielectric is, for example, polyethene the length of each of the cables is only slightly greater than the diameter of the array.

The single spark gap should preferably, but not necessarily, be located on the axis of the array. More specifically, the lines should be arranged in circular symmetry with respect to the array as shown in FIGURES 3*a* and 3*b*. Then all external currents induced by the oscillating array in the lines or in their shields cancel out to zero as was pointed out previously in respect to the leads *a* and *b* of FIGURES 1*a* and 1*b*. Otherwise, there is no restriction on the positioning of the lines. The lines may be folded back onto each other or alternate lines may be brought out to opposite sides of the array. Likewise, the slack part of the lines near the spark gap may be bunched together for convenience in mounting. It is only necessary that the lines withstand the charging voltage of the condensers and the oscillating current flowing in the array. The characteristic impedance of the lines is not important, at least to the first order. However, it is advantageous in some cases to design the lines for a large capacity per unit length consistent with high dielectric strength in order to increase the total energy storage in the array. The half wave lines themselves store about as much energy again as the condensers in the array even if they are commercial low-loss cables manufactured for radio transmission purposes. The transmitted pulse therefore becomes longer which is very desirable.

Figure 4:
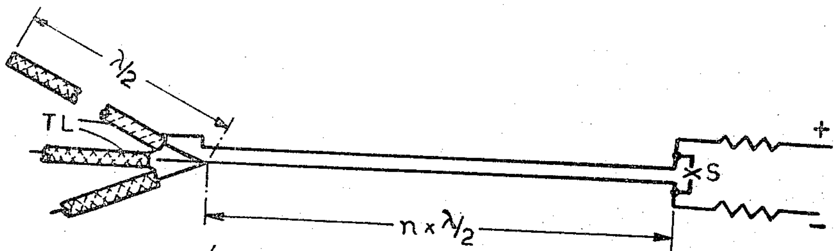

In this connection it must be pointed out that everything that has been said above in respect to half wave lines also hold correspondingly for transmission lines which are an arbitrary integral multiple of a half wave length long. When such lines are used it is possible to store still more energy of radiation. Alternatively, an auxiliary line of suitable characteristic impedance and a multiple of half wave lengths long can be inserted between the junction of the set of half wave lines and the spark gap terminals as shown in FIGURE 4.

Although with the present invention the diameter of the array is not restricted because all lines may be extended in steps of half wave lengths it will not be advisable to make the diameter much larger than one wave length except under special circumstances. It has been proved by calculation that the radiation pattern (polar diagram) begins to exhibit side lobes once the diameter exceeds 1.22 wave lengths. This is generally not a desirable condition.

Figure 5:
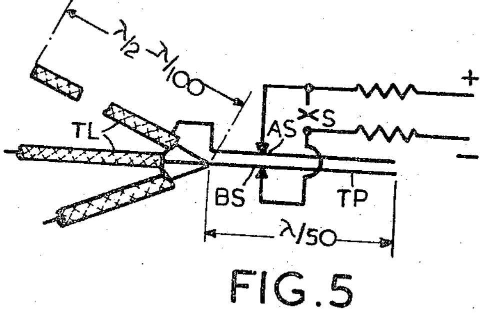

When transmission lines are used according to the invention as described the arrangement also allows for an infinitely variable tuning of the transmitted frequency over a small range as explained hereinafter in connection with FIGURE 5. For this purpose all lines TL are made slightly shorter than one half wave length, for example, by 1/100 of one wave-length. The junction of all lines is then connected to a short piece of line TP in which the conductors are electrically accessible so that the spark gap terminals AS and BS can be brought into contact with the conductors and the spark gap assembly can slide along these conductors. If the energy of oscillation is derived from an external oscillator, an arrangement to which reference was made previously, then the coupling device may be made to slide along the conductors. This short line TP should have a characteristic impedance of all half wave lines in parallel. In a typical case this tuning line may be about 1/50 of one wave length long. A simple way of constructing the tuning line is to attach flat strips of metal to both sides of a flat sheet of low-loss insulating material of suitable dimensions. When the spark gap assembly or, respectively, the coupling device referred to above is moved close to the junction of the plurality of lines a component of inductive reactance is reflected in series with the condensers of the array and so the frequency of the transmitted wave is decreased. When the spark gap terminals or the terminals of the coupling device are positioned close to the open end of the short line TP a component of capactive reactance is reflected in series with the condensers and then the frequency is increased. Tuning of the transmitter may therefore be effected without any physical changes in the array itself. As stated previously in connection with the tuning arrangement illustrated in FIGURES 2*a* and 2*b* tuning over a large frequency range will not in general be advisable.

From the foregoing it is clear that transmission lines of any electrical length, that is, not necessary multiples of half wave lengths long may be employed to reflect any desired series reactance into the array. At a given frequency and a given radiation resistance of the array this may, for example, be advantageously done in order to design the tuning condensers for a larger storage capacity than would otherwise be possible. It will, however, be pointed out in the following that such a procedure makes it more difficult in a spark transmitter to establish rapidly the desired frequency although in a transmitter which is driven by an external oscillator or when the arrangement is used to drive a secondary radiating circuit this difficulty does not arise as will be explained below.

The arrangement described above can dispense with an external tuned secondary circuit which is normally coupled by mutual inductance to the primary driving circuit. Such a secondary circuit is in general use when it is desired to improve the waveform and to control the pulse length of the emitted radio frequency pulse as for example referred to in United States Patent No. 3,011,051.

A further arrangement according to the invention will be explained in connection with FIGURES 6*a* and 6*b*. Let it be supposed first that the spark gap terminals are connected to a series tuned circuit L–C0 as well as to the junction of the half wave lines TL as illustrated diagrammatically in FIGURE 6*a*. When tuned to the working frequency the series impedance of this auxiliary tuned circuit approaches zero provided its Q-factor is high. If, in addition, the spark gap S is quenched rapidly then there occurs a periodic exchange of energy between the two circuits, that is, between the array and the auxiliary tuned circuit after the initial breakdown and the subsequent extinction of the spark. Quenching of the spark gap may be achieved by one of several well-known means, for instance, by dividing the total sparking distance up into several narrowly spaced gaps. It has been established by experiment that under these conditions the emitted wave in general takes the form of a succession of beats as is to be expected from a theory of such coupled circuits. If a steadily and monotonically decreasing pulse envelope is required it is necessary to reduce the coupling between the two circuits to a value near to critical coupling. This may be achieved in various ways. For the case of direct coupling as described above the junction of the transmission lines may simply be tapped into the tuning capacity consisting of the condensers C1 and C2 as shown in FIGURE 6*b*. The lumped auxiliary circuit need only withstand the charging voltage of the condensers in the array. However, both the auxiliary circuit as well as the decoupling condenser contribute towards the total energy storage in the transmitter. It is clear that the single auxiliary circuit is very much easier to construct than a secondary circuit coupled by mutual inductance to the main circuit and having approximately the same dimensions as the array itself. Under some conditions it is sufficient to shunt the spark gap by a condenser of sufficiently large reactance at the working frequency without the use of a tuned circuit. This improves the effectiveness of the spark gap very considerably, sufficient for many applications. However, the energy stored in such a shunting condenser is wasted in the spark discharge and it reduces the repetition frequency of the transmitter more than the auxiliary tuned circuit mentioned before. In consequence the transmitter then requires a power supply capable of delivering a higher charging current.

Further modifications of the arrangement according to the invention will now be described.

When transmission lines are used in the manner referred to, it is of importance that the wave mode corresponding to the frequency of oscillation of the transmitting array establishes itself in the lines as rapidly as possible after the breakdown of the spark gap. If there is a delay in establishing this mode then the stored energy is partly converted into other undesirable modes which do not contribute to the radiation of energy at the desired frequency. The speed with which the desired mode establishes itself depends on whether lines are used which are exactly or approximately a single half wave length long or exactly or approximately a multiple of one half wave length long. In particular the speed also depends on the radiation resistance of the array and the effectiveness of the quenching of the spark gap. When single half wave lines are used and when the diameter of the array, that is, the radiation resistance is small then the half wave mode establishes itself within a few cycles of oscillation after breakdown of the spark gap. However, when the radiation resistance is large then the delay between breakdown of the spark gap and the development of the desired mode is also large. This delay may be shortened to negligible proportions by connecting auxiliary condensers across the terminals $\alpha$ and $\beta$ of the tuning condensers. It has been found by experiment that the capacity of these auxiliary condensers should be of the same order as or somewhat larger than the capacity of the tuning condensers. Alternatively and to achieve the same result the terminal pairs $\alpha$ and $\beta$ shown in FIGURE 3*a* may be connected by pairs of leads *a* and *b* to two terminal points A and B on the axis of the array exactly as in the arrangement of FIGURES 1*a* and 1*b*. These sets of leads are used in addition to the set of transmission lines TL. Instead of the spark gap shown in FIGURE 1*a* a single condenser is connected to terminals A and B. Experimentally it was found that for most efficient suppression of undesirable modes in the transmission lines the capacity of this condenser should be of the same order of magnitude as the total tuning capacity in the array.

Figure 6A:
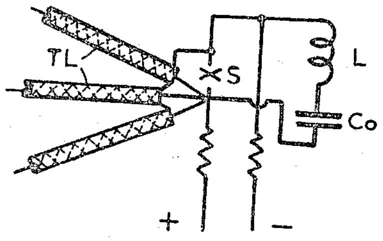
Figure 6B:
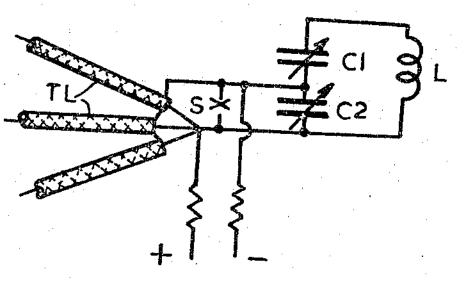

If the radiation resistance of the array is high and if multiple half wave lines are used then in addition to the mode suppression methods described rapid quenching of the spark gap and the use of a primary tuned circuit as shown in FIGURES 6*a* and 6*b* are essential. Experiments have shown that rapid quenching of spark gaps may be effectively achieved at low or moderate currents but that it becomes increasingly difficult with high currents passing through the spark. Then it is necessary, in addition to the means of mode suppression mentioned, to divide the multiple half wave line into a series of single half wave lines separated by condensers of suitable capacities because otherwise too much energy is lost in unwanted modes of oscillation in the multiple half wave lines. The most favourable value of the capacity of these condensers depends on the frequency of oscillation of the transmitter and the characteristic impedance of the transmission lines used and is best found by experiment.

Figure 7A:
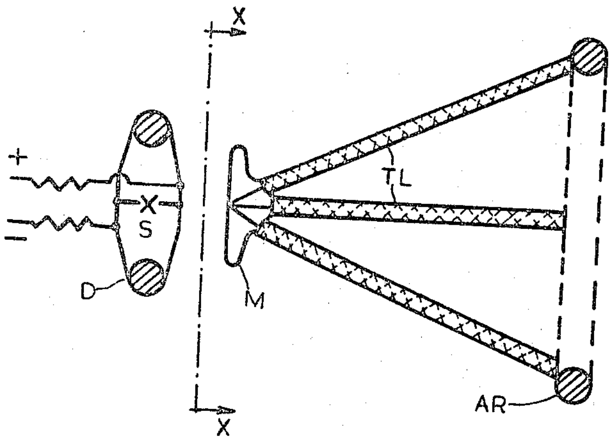
Figure 7B:
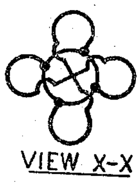

A further form of the arrangement according to the invention will now be described which is advantageous for many applications. As has been explained in connection with the particular embodiments of the invention shown in FIGURES 1*a* and 1*b* and FIGURES 3*a* and 3*b* it is possible, and important for the usefulness of these devices, to replace the spark gap by a small coupling loop or other coupling device for the purpose of injecting oscillation energy into the transmitters from an external oscillator. In such a case it is sometimes most advantageous to use as driving oscillators any of the transmitters either described in the United States Patent No. 3,011,051 or by FIGURES 1*a* and 1*b* or FIGURES 3*a* and 3*b* of the present invention and, depending on the particular circumstances, with any modifications mentioned herein. To make these transmitters more suitable as driving oscillators the diameter of the driving array is made much smaller than one wave length so that they essentially do not radiate. In addition they may be enclosed in a metal screen. It is then possible to store as much or more energy in the driving oscillator than in the radiating array which now performs the function of a secondary circuit. Such an arrangement is shown schematically in FIGURE 7*a*. FIGURE 7*b* is an axial view of the coupling device M which in this particular example consists of four separate metal loops joining the inner and outer conductors of the transmission lines TL and being arranged in clover leaf fashion. This particular form of the coupling device allows symmetry in the arrangement to be maintained. However, one single coupling loop or other means may be used if desired in order to couple the transmitter to the driving oscillator by mutual inductance or direct contact. In FIGURE 7*a* D is the driving circuit which in this example is constructed according to the principles embodied in FIGURES 1*a* and 1*b*. The secondary circuit is now carrying radio frequency currents only and the wave form transmitted is found to be free from undesirable components.

Figure 8A:
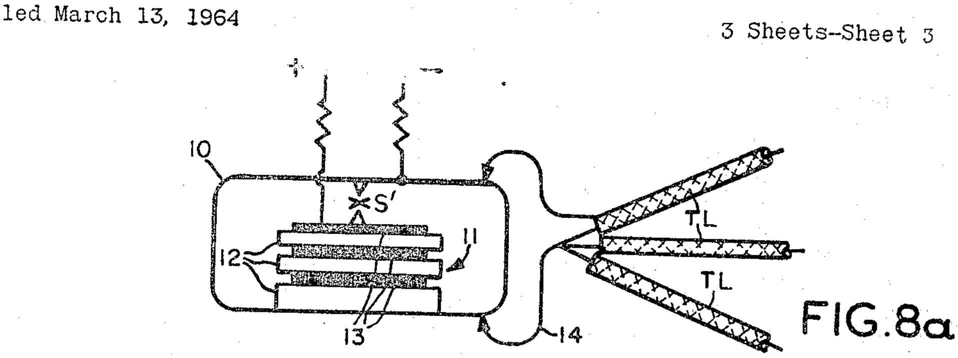
Figures 8B, 9, 10:
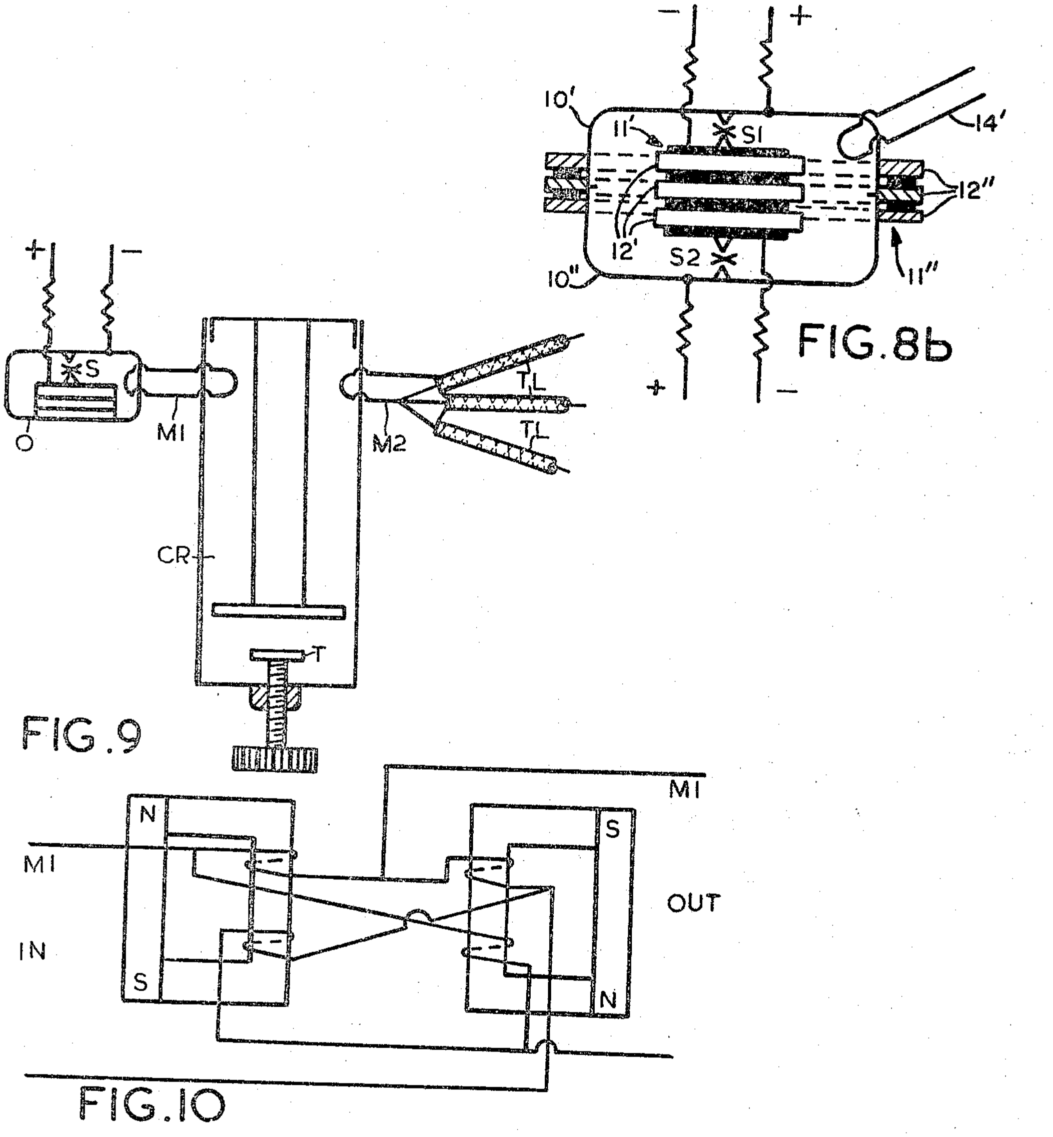
FIGURE 9 shows the mutual connection of a transmitter a resonant cavity and the driving oscillator shown in FIGURE 8*a*.
FIGURE 10 shows details of a winding arrangement for frequency multiplication to be incorporated in the arrangement of FIGURE 9.

A further embodiment of the principle of using driving and radiating circuits according to this invention is shown in FIGURES 8*a* and 8*b*. As the frequency of oscillation is extended to higher values a limit is reached where oscillators designed according to FIGURES 1*a* and 1*b* or 3*a* and 3*b* will cease to be useful. This frequency limit may now be considerably extended by transforming the circular array into the form of a completely closed conducting shell. In FIGURE 8*a* 10 is the closed conductive shell which forms the circuit inductance, 11 is a condenser formed of one or more discs 12 of dielectric material separating the condenser plates 13. The uppermost condenser plate 13 forms one terminal of the spark gap S′ while the top part of the shell 10 forms the other terminal. The dielectric of discs 12 consists preferably of a ceramic, like barium titanate, with a high dielectric constant. Such compounds with dielectric constants in excess of 1000 and dielectric strengths of about 100 kv. per inch are available. If several plates 12 of dielectric material are used in a stack in order to make up the desired values of capacity and breakdown strength then it is preferable to separate these plates by thin metallic discs 13 in order to improve the field distribution. The shell 10 may be partly filled with insulating oil in order to prevent flashover. The structure is also suitable for pressurization with air or inert gases for the purpose of reducing the sparking distance between spark gap electrodes and to prevent unwanted discharges. 14 is a coupling loop which serves to transfer the energy of oscillation into the driven array.

A further modification of this arrangement is shown in FIGURE 8*b*. Here the conducting shell consists of two halves 10′ and 10″. 11′ is a condenser or dielectric cylinder constructed in a fashion similar to the dielectric cylinder 11 in FIGURE 8*a* including spaced dielectric disc 12′, and $d_2''$ is a ring shaped body surrounding the shell and forming a condenser, formed of dielectric discs 12″. With this particular arrangement it is necessary to provide two spark gaps $S_1$ and $S_2$; however, this is by no means an objectionable feature of this design since the shape of the oscillator is very compact in contradistinction to the array according to United States Patent No. 3,011,051 where the size is determined by the desired radiation resistance. Furthermore, methods will be referred to later which allow a single spark gap to be used with this arrangement. It should be noted that the two capacities 11′ and 11″ formed by the spaced dielectric discs 12′ and 12″ are in parallel during charging and in series during discharging and that therefore higher powers may be produced for a given charging voltage. This device also extends the useful frequency range of the oscillations. Furthermore, it is clear that 11′ and 11″ may physically be formed by one or more continuous sheets of dielectric dividing the shell into two halves and not necessarily by single cylinders and rings as shown at 12′ and 12″.

It is further pointed out that both the configurations represented by FIGURES 8*a* and 8*b* are geometrical transformations into toroidal form of the circular array described in the main patent. The transformation is a rotation of the circular arrangement of condensers around a tangent of the circle. It was shown by calculations and by experiments that very large amounts of energy of oscillation may be stored in and produced by such oscillators up to frequencies of approximately 50 mc./s. in particular when employing ceramic dielectrics of barium titanate type.

It is possible to apply the principles outlined in connection with FIGURES 1*a* and 1*b* also to oscillators like the one shown in FIGURE 8*b*, that is, to use a single spark gap instead of two gaps. This may be accomplished by a further geometrical transformation of FIGURES 1*a* and 1*b*. Moreover, it is possible to use more than two capacities in such a shell type oscillator. However, at present it is believed that except under special circumstances the additional complication resulting from such refinements offsets the advantages obtained because the following further modification of the present invention is much simpler in concept and easier to construct.

This arrangement will be explained in connection with FIGURE 9. In this figure O is a driving oscillator of any of the types described previously. A shell type oscillator described previously in connection with FIGURE 8*a* is actually shown by way of example. CR is a cavity resonator of arbitrary shape, the one illustrated in the drawing being of the quarter wave transmission line type because in this type of cavity the dominant mode is easily excited. T is a tuning condenser used to tune the cavity to the desired frequency. The cavity is coupled for example by inductive loops $M_1$, and $M_2$, to the driving oscillator O and to the transmitting lines TL of the array respectively. The cavity is first tuned to a frequency identical with the resonant frequency of the array. The driving oscillator may be tuned to the frequency of the cavity but it is one of the essential points of this invention that it may also be tuned to any sub-harmonic frequency of the cavity. Since the Q-factor of such cavities is extremely high it only accepts components of its own frequency from the oscillator and passes them on to the transmitting array. In this way a frequency multiplication effect such as doubling, tripling etc. of the oscillator frequency may be achieved. The frequency multiplication action is greatly enhanced if the wave form of the oscillator is purposely distorted, for example by inserting rectifiers such as solid state diodes in the coupling loop $M_1$ which transfers the energy of oscillation into the cavity. It has, for instance, been found that four diodes arranged in the well-known rectifier bridge circuit are very suitable. For high frequencies, where the rectification efficiency of such diodes diminishes rapidly, saturable reactances may be used instead of rectifiers. The reactances consist of a winding of one or more turns wound preferably onto a ferrite core. The core is magnetized to saturation by a permanent magnet or by a separate winding carrying a steady D.C. current. Such ferrite cores are available which saturate at field strengths ranging from a few oersteds to several hundred oersteds. The permanent magnet used for the saturation may also be made of a type of ferrite with a high coercive force. A suitable arrangement of windings is shown in FIGURE 10 where four windings are fitted in pairs to common magnetic cores and connected in the manner of a rectifier bridge circuit. The windings may also be fitted to separate cores. Such ferrite cores are effective up to frequencies of several hundred megacycles per second.

If the transmitter is only lightly loaded by radiation resistance then the cavity as an intermediate element is not necessary.

The frequency multiplication device removes any restriction on transmitting frequency imposed by the oscillator. The essential advantage of this form of the arrangement according to the invention is that the driving spark oscillator is a lumped circuit which can have only one mode of oscillation and so does not produce any unwanted modes in the first place. The combination of parts forming this arrangement is also simple to construct and to adjust and insulation requirements are easily met because direct current voltages are essentially restricted to the interior of the driving oscillator. A further advantage of this arrangement is that the peak power and the length of the radiated pulse may to a large extent be adjusted independently by designing the driving oscillator for a given peak power and the energy storage in the driven array to produce a given pulse length.

It is clear that if any of these structures as described in FIGURES 1*a* and 1*b* or FIGURES 3*a* and 3*b* are driven by a separate oscillator in the manner described, then the condensers in the driven array may be replaced by conductors and then the driven structure is not resonant.

It should be emphasized that all circularly symmetrical points of the transmitting arrays such as the points $\alpha$ or, respectively, $\beta$ of FIGURES 1*a* and 1*b* or of FIGURES 3*a* and 3*b* are equipotential points, that is, if these points are connected by circularly symmetrical conductors then no currents will flow through the latter. Such connections may, however, be made if it is, for example, desired to compensate for small inaccuracies in the components such as the tuning condensers or to suppress unwanted modes of oscillation. However, if this is done then the tuning facilities mentioned above are impaired or even lost entirely.

I claim:

1. Means for generation and transmission of very large pulses of radio frequency waves, said means consisting of a tank circuit constructed as a single radio frequency circuit incorporating a number of electrical reactor units arranged symmetrically and forming a closed circular and annular array, each said unit consisting of a condenser having a pair of terminals, a first and a second conductor for each said condenser connected respectively to opposite terminals of said pair, a spark gap common to all said reactor units, all said first conductors being of substantially equal length and connected to one side of said spark gap and all said second conductors being of substantially equal length and connected to the other side of said spark gap, a source of potential connected across said spark gap, and said conductors being arranged symmetrically radial in relation to said annular array, said tank circuit being extended spatially to constitute a magnetic dipole aerial the diameter of the said circuit being determined by the wave length and the radiation resistance of the signal transmitted.

2. Means for generation and transmission of very large pulses of radio frequency waves, said means consisting of a tank circuit constructed as a single radio frequency circuit incorporating a number of electrical reactor units arranged symmetrically and forming a closed circular and annular array, each said unit consisting of a condenser having a pair of terminals, a first and a second conductor for each said condenser connected respectively to opposite terminals of said pair, a spark gap common to all said reactor units, all said first conductors being of substantially equal length and connected to one side of said spark gap at a point on the axis of symmetry of said array and all said second conductors being of substantially equal length and connected to the other side of said spark gap at another point on the axis of symmetry of said array, a source of potential connected across said spark gap, said first conductor and said second conductor of adjacent reactor units around said array and being arranged in pairs symmetrically in relation to said annular array, and said tank circuit being extended spatially to constitute a magnetic dipole aerial the diameter of the said circuit being determined by the wave length and the radiation resistance of the signal transmitter.

3. Means for generation and transmission of very large pulses of radio frequency waves according to claim 2 in which one conductor of each pair of conductors is deformed symmetrically about the array relative to the other conductor of said pair to impart mutual inductance to the inductance of the array to change the resonance frequency thereof.

4. Means for generation and transmission of very large pulses of radio frequency waves, said means consisting of a tank circuit constructed as a single radio frequency circuit incorporating a number of electrical reactor units arranged symmetrically and forming a closed circular and annular array, each said unit consisting of a condenser, a first and a second conductor in each said unit connected to opposite sides of said respective condenser, a spark gap common to all said reactor units, terminals on said spark gap connected respectively with all said first conductors and all second conductors at different points on the axis of symmetry of said array, a source of potential connected across said spark gap, said first conductor of each said reactor unit around said array and said second conductor of each adjacent reactor unit being grouped together to form an individual transmission line, all said transmission lines being arranged symmetrically radial in relation to said array, said tank circuit being extended spatially to constitute a magnetic dipole aerial the diameter of the said circuit being determined by the wave length and the radiation resistance of the signal transmitted.

5. Means for generation and transmission of very large pulses of radio frequency waves according to claim 4 in which said first conductor and said second conductors of each of said transmission lines around said array are of substantially equal length, and have a length of one-half wave length of the signal transmitted or a multiple thereof.

6. Means for generation and transmission of very large pulses of radio frequency waves according to claim 4 in which tuning means are interposed in the connection between the spark gap and all said transmission lines to tune all said transmission lines simultaneously in accordance with the required resonant frequency of said array.

7. Means for generation and transmission of very large pulses of radio frequency waves, said means comprising a first tank circuit constructed as a first radio frequency circuit of low radiation resistance and a second tank circuit constructed as a second radio frequency circuit of high radiation resistance, each said radio frequency tank circuit incorporating a number of electrical reactor units arranged symmetrically and forming closed circular and annular first and second arrays each extended spatially, each said reactor unit consisting of a condenser, a first and a second conductor in each said unit connected to opposite sides of the respective condenser, a spark gap common to all said reactor units of said first radio frequency tank circuit, one side of said spark gap being connected with all first conductors of said first tank circuit at a point on the axis of symmetry of said first array and being connected with all second conductors of said first tank circuit at another point on the axis of symmetry of said first array, a source of potential connected across said spark gap, coupling means connected with the first and second conductors of said second radio frequency tank circuit at respective points on the axis of symmetry of the second array and electrically coupled with said first radio frequency tank circuit, the said first and second conductors in each radio frequency tank circuit being respectively grouped together to form transmission lines in the respective first and second arrays, each transmission line including the first conductor of one reactor unit and the second conductor of the adjacent reactor unit around the array, and all transmission lines of the first radio frequency tank circuit and all transmission lines of the second radio frequency tank circuit being arranged symmetrically radial to their respective arrays, said first and second arrays constituting a magnetic dipole aerial.

8. Means for generation and transmission of very large pulses of radio frequency waves, said means comprising a first radio frequency oscillator circuit of low radiation resistance and a second radio frequency oscillator circuit of high radiation resistance, said first radio frequency oscillator circuit consisting of a closed electrically conducting shell forming the circuit inductance, a plurality of first condensers in said shell, a spark gap in said shell electrically connected with said first condensers forming the first oscillator circuit, said shell and a source of potential connected across said spark gap, and said second radio frequency oscillator circuit incorporating a number of electrical reactor units arranged symmetrically and forming a closed circular and annular array, each said unit consisting of a second condenser, a first and second conductor in each said unit connected to opposite sides of the respective second condenser, coupling means connected with said first and said second conductors of each said unit at respective points on the axis of symmetry of said array and being electrically coupled with said shell, said first and second conductors of each said unit being of equal lengths and being arranged in pairs, each pair comprising the first conductor of one reactor unit and the second conductor of the respective adjacent reactor unit around the array.

9. Means for generation and transmission of very large pulses of radio frequency waves according to claim 8 in which said first condensers contain ceramic dielectric material and are separated from each other by ceramic dielectric material.

10. Means for generation and transmission of very large pulses of radio frequency waves according to claim 8 in which said first condensers contain barium titanate as dielectric material and are separated from each other by barium titanate.

11. Means for generation and transmission of very large pulses of radio frequency waves according to claim 8 in which the shell is filled with an insulating fluid.

12. Means for generation and transmission of very large pulses of radio frequency waves, said means comprising a first radio frequency oscillator circuit of low radiation resistance and a second radio frequency oscillator circuit of high radiation resistance, said first radio frequency oscillator circuit consisting of two electrically conducting half-shells placed together to form a closed shell, a plurality of condensers associated with each half-shell and separated therefrom by ceramic dielectric material, a spark gap in each half-shell electrically connected with said condenser and the respective half-shell, a source of potential connected across said spark gaps and said second radio frequency oscillator circuit incorporating a number of electrical reactor units arranged symmetrically and forming a closed circular and annular array, each said unit consisting of a capacitor a first and second conductor in each said unit connected to opposite sides of the respective capacitor, coupling means connected with said first and second conductors of each reactor unit at respective points on the axis of symmetry of said array and being electrically coupled with said closed shell, said first and second conductors of each said unit being of equal lengths and being arranged in pairs, each pair comprising the first conductor of one reactor unit and the second conductor of the respective adjacent reactor unit around the array.

13. Means for generation and transmission of very large pulses of radio frequency waves, said means comprising a driver tank circuit constructed as a radio frequency circuit of low radiation resistance and a driven tank circuit constructed as a radio frequency circuit of high radiation resistance, said driver radio frequency circuit incorporating a number of first condensers, a spark gap, a source of potential connected across said spark gap, a pair of conductors of equal length connected to opposite sides of each first condenser, one conductor of each pair connected to one side of said spark gap and the other conductor of each pair connected to the other side of said spark gap, all pairs of conductors arranged radially symmetrically and said first condensers arranged symmetrically to form an annular spatially extended array, said driven radio frequency circuit incorporating a number of electrical reactor units arranged symmetrically and forming a closed circular and annular array extended spatially to constitute a magentic dipole aerial, each said unit consisting of a second condenser a first and a second conductor in each unit connected to opposite sides of the respective second condenser, said conductors being arranged symmetrically radially in relation to said array all first conductors and all second conductors of the number of reactor units being respectively joined at individual points on the axis of symmetry of said array, all said first and second conductors being of equal lengths, and a cavity resonator inductively coupling said driver circuit with said driven circuit frequency multiplication and stabilization are produced.

14. Means for generation and transmission of very large pulses of radio frequency waves according to claim 13 including saturable reactances connected in the inductive coupling between said driver circuit and said cavity resonator.

References Cited by the Examiner

UNITED STATES PATENTS

| | | | |
|---|---|---|---|
| 1,216,615 | 2/1917 | Seibt | 325—107 X |
| 1,554,232 | 9/1925 | Press | 325—124 X |
| 1,730,903 | 10/1929 | Schmidt et al. | 325—173 X |
| 2,051,520 | 8/1936 | Evans | 325—124 |
| 2,166,750 | 7/1939 | Carter | 343—742 |
| 2,327,485 | 8/1943 | Alford | 343—743 |
| 2,407,245 | 9/1946 | Benioff | 325—107 |

DAVID G. REDINBAUGH, *Primary Examiner.*

B. V. SAFOUREK, *Assistant Examiner.*